C. C. TAINTOR.
Lamp Stove.
No. 66,752.
Patented July 16, 1867.
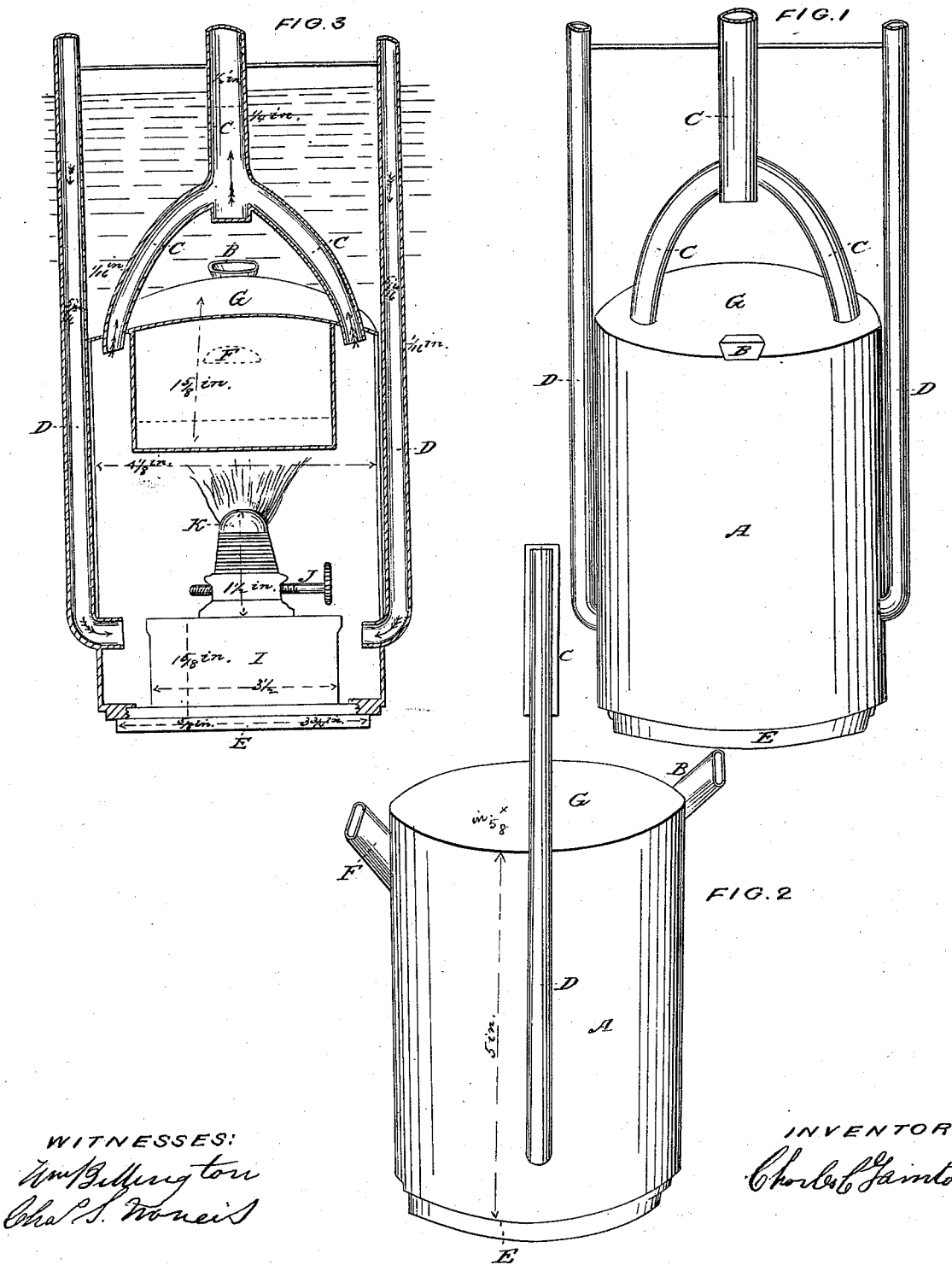

United States Patent Office.

CHARLES C. TAINTOR, OF SPRINGFIELD, ILLINOIS.

Letters Patent No. 66,752, dated July 16, 1867; antedated June 26, 1867.

APPARATUS FOR WARMING WATER BY PETROLEUM LAMP.

*The Schedule referred to in these Letters Patent and making part of the same.*

TO ALL WHOM IT MAY CONCERN:

Be it known that I, CHARLES C. TAINTOR, of Springfield, in the county of Sangamon, in the State of Illinois, have invented a new and improved Water-Warmer (or Heater); and I do hereby declare that the following is a full and exact description thereof, reference being had to the accompanying drawings, with the letters of reference marked thereon.

The nature of my invention consists in providing a common coal-oil or petroleum lamp (marked E, I, J, and K) or lamps, and screwing the same into the bottom of a cylindrical copper vessel or casing, as shown in the sectional drawing Figure No. 3.

E is a copper rim three-eighths of an inch thick, into which is let a tin vessel, I, to contain the coal oil or petroleum. K is a perforated burner, fixed on the top of the tin vessel I. A cotton band or wick is placed in the burner and let down into the vessel I, to saturate in the oil, from which it is drawn up and adjusted to the burner by the screw J. The cylindrical vessel A is made of sheet copper, one-sixteenth of an inch thick, four and one-eighth inches in diameter, and five and five-eighths inches deep from the top of the conical head G. In the interior of the cylindrical vessel A, and as shown in fig. 3, is fixed another copper vessel or boiler, H, and which has no opening or connection with the interior of vessel A. It is supplied with water by the pipes B and F, which pass from its inner side through and to the outside of vessel A into the water surrounding it. At the top of vessel A, and between its inner sides and the outer sides of boiler H, are let pipes C C, to carry off the surplus heat from the interior of vessel A through to the outside and above the water-line in the bath. As the water in the boiler H becomes heated, it passes off and mixes with the water in the bath outside of the vessel A by the pipe B, which is attached to and opens into the top of boiler H, and thus warms the water in the bath. The pipe F passes through the side of the boiler and opens into it at the bottom, and keeps the boiler supplied with the water of the coolest temperature of the bath. The pipes D D are attached to the sides of the vessel A, and convey cold air to the interior at the bottom of it, as shown on drawing, fig. 3, to feed the burner on lamp. These heaters may be increased in size, so as to contain two, three, four, five, or six lamp-burners, according to the quantity of water to be heated, or, if required, boiled. A warmer with three burners eight inches deep and six inches in diameter will heat fifteen hundred gallons of water to a temperature more than sufficient for a bath, by placing it when lighted in the water at the bottom of the bath, in the space of five or six hours.

There is no dirt made by this warmer. All the smoke is consumed.

By its application much time, trouble, and expense is saved, more than by the application of any other method now used, particularly for large baths.

I claim as my invention, and desire to secure by Letters Patent—

The lamp I, in combination with the air-pipes D D and eduction-pipes C C C, when arranged to operate in vessel A in combination with boiler H, as shown.

CHARLES C. TAINTOR.

Witnesses:
ELISHA HURT,
WM. BILLINGTON.